US009152365B2

(12) United States Patent
Hikichi

(10) Patent No.: US 9,152,365 B2
(45) Date of Patent: *Oct. 6, 2015

(54) IMAGE PROCESSING APPARATUS, NETWORK SYSTEM, INFORMATION PROCESSING METHOD, PROGRAM, AND STORAGE MEDIUM

(71) Applicant: Yukiyoshi Hikichi, Tokyo (JP)

(72) Inventor: Yukiyoshi Hikichi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/925,503

(22) Filed: Jun. 24, 2013

(65) Prior Publication Data
US 2014/0002855 A1 Jan. 2, 2014

Related U.S. Application Data

(63) Continuation of application No. 13/401,823, filed on Feb. 21, 2012, now Pat. No. 8,477,356, which is a continuation of application No. 11/189,773, filed on Jul. 27, 2005, now abandoned.

(30) Foreign Application Priority Data

Jul. 28, 2004 (JP) ................................. 2004-220685

(51) Int. Cl.
G06F 3/12 (2006.01)
H04N 1/00 (2006.01)

(52) U.S. Cl.
CPC ............ G06F 3/1293 (2013.01); G06F 3/1213 (2013.01); G06F 3/1244 (2013.01); G06F 3/1275 (2013.01); G06F 3/1288 (2013.01); H04N 1/0097 (2013.01);

(Continued)

(58) Field of Classification Search
USPC ....................................................... 358/1.15
See application file for complete search history.

(56) References Cited

U.S. PATENT DOCUMENTS 5,857,073 A 1/1999 Tsukamoto et al.
7,120,910 B2 10/2006 Matsuda et al.
(Continued)

FOREIGN PATENT DOCUMENTS

JP 3-180378 A 8/1991
JP 8-16368 A 1/1996
(Continued)

Primary Examiner — Fan Zhang
(74) Attorney, Agent, or Firm — Fitzpatrick, Cella, Harper & Scinto

(57) ABSTRACT

Maintenance of a plurality of image processing apparatuses connected to a network at low cost while suppressing the time and labor is realized. An image processing apparatus includes a unit which stores set information for operating the image processing apparatus, a unit which updates the set information by using set information which is received via a network from another image processing apparatus connected to the network and used to operate the image processing apparatus, a storage unit which stores the set information before update by the update unit, a return instruction acceptance unit which accepts from the user an instruction to return the updated set information to the set information before update, and a return unit which returns the set information to the set information before update when the return instruction acceptance unit accepts the instruction to return the set information to the set information before update.

24 Claims, 11 Drawing Sheets

(52) U.S. Cl.
CPC ...... *H04N 1/00347* (2013.01); *H04N 1/00973* (2013.01); *H04N 2201/0039* (2013.01); *H04N 2201/0093* (2013.01); *H04N 2201/0094* (2013.01); *H04N 2201/0098* (2013.01)

(56) References Cited

U.S. PATENT DOCUMENTS

| | | |
|---|---|---|
| 7,139,102 B2 | 11/2006 | Minato |
| 7,194,526 B2 | 3/2007 | Kanemitsu |
| 7,200,728 B2 | 4/2007 | Okabayashi et al. |
| 7,359,074 B2 | 4/2008 | Ito |
| 2002/0044308 A1 | 4/2002 | Sekiya et al. |
| 2002/0093675 A1 | 7/2002 | Matsuda |
| 2002/0161936 A1 | 10/2002 | Minagawa |
| 2003/0041140 A1 | 2/2003 | Matsumoto |
| 2004/0070774 A1 | 4/2004 | Ishibashi et al. |
| 2004/0083470 A1* | 4/2004 | Michimura et al. .......... 717/168 |
| 2004/0093598 A1 | 5/2004 | Haga et al. |
| 2004/0098471 A1* | 5/2004 | Shima .......................... 709/221 |
| 2004/0133553 A1 | 7/2004 | Suto |
| 2004/0196500 A1 | 10/2004 | Ichiki |
| 2004/0267808 A1 | 12/2004 | Matsushima |
| 2005/0055451 A1 | 3/2005 | Tsuyama et al. |
| 2006/0271936 A1 | 11/2006 | Matsuda et al. |

FOREIGN PATENT DOCUMENTS

| | | |
|---|---|---|
| JP | 8-197813 A | 8/1996 |
| JP | 8-328770 A | 12/1996 |
| JP | 10-309848 A | 11/1998 |
| JP | 2002-152484 A | 5/2002 |
| JP | 2003-69569 A | 3/2003 |
| JP | 2004-5505 A | 1/2004 |
| JP | 2004-88182 A | 3/2004 |
| JP | 2004-112794 A | 4/2004 |
| JP | 2004-208012 A | 7/2004 |

* cited by examiner

IMAGE PROCESSING APPARATUS, NETWORK SYSTEM, INFORMATION PROCESSING METHOD, PROGRAM, AND STORAGE MEDIUM

This application is a continuation of U.S. application Ser. No. 13/401,823, filed Feb. 21, 2012 (pending), which is a continuation of U.S. application Ser. No. 11/189,773, filed Jul. 27, 2005 (abandoned), the contents of each of which are incorporated herein by reference.

FIELD OF THE INVENTION

The present invention relates to a processing technique of processing set information in an image processing apparatus connectable to a network.

BACKGROUND OF THE INVENTION

Image processing apparatuses typified by a copying machine and printer are generally used by connecting them to a network, and their functions become more and more complicated these days. For example, a recent image processing apparatus is equipped with, e.g., a function of directly attaching image data read using a scanner function to e-mail and transmitting the e-mail. With the progress to multiple functions, "set information" (information for properly operating an image processing apparatus) which is set in the image processing apparatus is also diversified.

The number of image processing apparatuses which are used by connecting them to a network tends to increase as the number of users increases. Many image processing apparatuses are generally connected to one network and used.

While diversification of set information and the increase in the number of connected image processing apparatuses proceed, only a few administrators perform "maintenance" such as rewrite of set information to the image processing apparatus. Various kinds of set information of many image processing apparatuses connected to a network are maintained by only a few administrators for time-consuming jobs with much hard labor.

Maintenance such as rewrite of set information is generally done via a setting window. FIG. 11 shows an example of the setting window used to perform maintenance. In general, the administrator inputs pieces of set information for set items shown in FIG. 11 one by one via the operation panel of each image processing apparatus. Alternatively, the administrator inputs pieces of set information for items one by one to each image processing apparatus by using a Web browser from a personal computer (to be referred to as a PC hereinafter) connected to the network.

However, the image processing apparatus has many set items as set information diversifies, as described above. The number of image processing apparatuses to be set increases as the number of connected apparatuses increases. The load of maintenance on the administrator becomes heavier.

In order to reduce the load of maintenance, various methods have conventionally been proposed. For example, according to Japanese Patent Laid-Open No. 2004-088182, a Web server is installed in an image processing apparatus. The administrator uses a PC to save set information as a file in the PC, and write the saved set information file in each image processing apparatus via a Web browser. This can increase the efficiency of maintenance regardless of an increase in the number of set items.

For example, all image processing apparatuses having the e-mail function must update their destination tables in maintaining the destination table, in order to provide a common destination table as set information to the image processing apparatuses connected to a network. To reduce the work load in this case, according to Japanese Patent Laid-Open No. 2004-112794, a directory server is located on the network, and an address book in the directory server is so designed as to be referable by image processing apparatuses, giving the same addresses to all the image processing apparatus.

However, according to the above-described method of locating a directory server on a network, an expensive directory server must be purchased, and the cost rises. Management of the directory server generally requires skill, and needs a professional administrator.

To the contrary, the method of writing set information saved as a file into each image processing apparatus via a Web browser can suppress the cost and the work load of maintenance regardless of an increase in the number of set items. However, downloading must be repeated by the number of image processing apparatuses connected to a network, and the work time for maintenance becomes longer in proportion to an increase in the number of image processing apparatuses connected to a network.

SUMMARY OF THE INVENTION

The present invention has been made to overcome the conventional drawbacks, and has as its object to realize maintenance of a plurality of image processing apparatuses connected to a network at low cost while suppressing the time and labor.

In order to achieve the above object, an image processing apparatus according to the present invention comprises the following arrangement. That is, an image processing apparatus connectable to a network, comprising:

holding unit configured to hold set information for operating the image processing apparatus;

update unit configured to update the set information held by the holding unit by using set information which is received via the network from another image processing apparatus connected to the network and used to operate the another image processing apparatus;

storage unit configured to store the set information before update by the update unit;

return instruction acceptance unit configured to accept from a user an instruction to return the set information updated by the update unit to the set information before update; and return unit configured to return the set information to the set information before update that is stored in the storage unit when the return instruction acceptance unit accepts the instruction to return the set information to the set information before update.

According to the present invention, maintenance of a plurality of image processing apparatuses connected to a network can be realized at low cost while suppressing the time and labor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodi

DETAILED DESCRIPTION OF THE PREFERRED EMBODIMENTS

Figure 1:
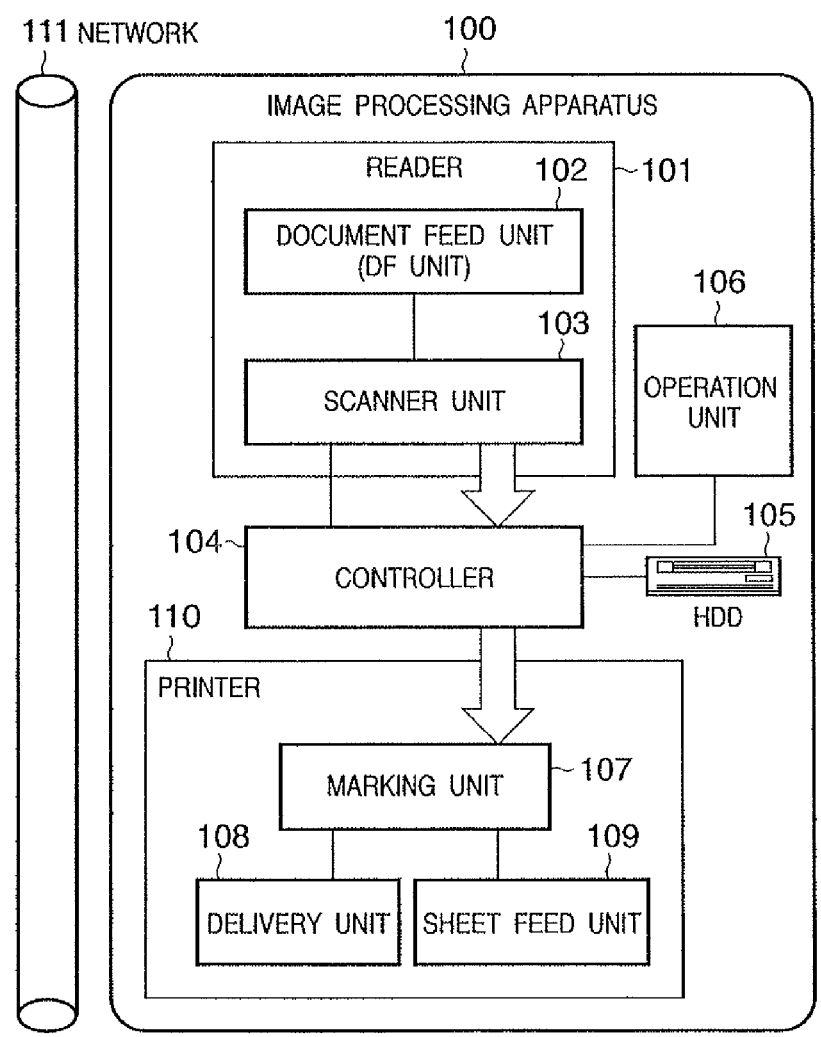
- FIG. 1 is a view showing the arrangement of an image processing apparatus according to an embodiment of the present invention.

Preferred embodiments of the present invention will now be described in detail in accordance with the accompanying drawings.

An outline of an image processing apparatus according to an embodiment of the present invention will be described. In order to achieve the above object, the image processing apparatus according to the embodiment comprises a function (transmission/reception function) of transmitting set information of the image processing apparatus to another image processing apparatus connected to a network or updating set information transmitted from another image processing apparatus as set information of the image processing apparatus. With this function, the administrator need not repeat downloading by the number of image processing apparatuses connected to a network by using a PC, unlike the prior art. By maintaining only set information of a specific image processing apparatus, the remaining image processing apparatuses are automatically maintained. Maintenance can be realized at low cost while suppressing the time and labor.

On the other hand, since conventional image processing apparatuses undergo downloading by the administrator using a PC, no mismatch occurs in set information between image processing apparatuses, and no set information falling outside the rewrite range is rewritten. However, the above-mentioned function causes new problems: mismatch in set information and accidental rewrite of reference set information because a plurality of image processing apparatuses connected to a network transmit pieces of set information. To solve these problems, an image processing apparatus according to the embodiment eliminates a mismatch in set information with another image processing apparatus by the transmission/reception function. The image processing apparatus also eliminates rewrite not intended by the administrator by newly adopting a function (rejection function of update of set information) of rejecting update when set information of the image processing apparatus is updated to set information transmitted from another image processing apparatus, and a function (set information return function) of returning updated set information to original one.

When an image processing apparatus of a different type is included in maintaining conventional image processing apparatuses, set information of each image processing apparatus is converted into a proper data form. As for the image processing apparatus according to the embodiment, set information must be updated by exchanging pieces of set information between image processing apparatuses. For this purpose, the image processing apparatus according to the embodiment newly employs a function (data form conversion function) of determining set information common between the image processing apparatuses and converting an uncommon data form.

The conventional image processing apparatus requires downloading again when an error occurs due to a network failure or the like upon downloading into each image processing apparatus by the administrator using a PC. To minimize the labor of the administrator even upon occurrence of an error, the image processing apparatus according to the embodiment further comprises a function (retransmission function) of easily retransmitting set information to the same destination. Details of the embodiment will be explained below with reference to the accompanying drawings, as needed.

<Arrangement of Image Processing Apparatus>

The arrangement of the image processing apparatus according to the embodiment will be described with reference to FIG. 1. An image processing apparatus 100 comprises a set information transmission/reception function, and is, e.g., a network-connectable copying machine capable of reading and printing a document.

Reference numeral 101 denotes a reader which optically reads a document image and converts it into image data. The reader 101 comprises a scanner unit 103 having a function of reading a document and a document feed unit (DF unit) 102 having a function of conveying a document sheet.

A printer 110 conveys a print paper sheet, prints image data as a visible image on the print paper sheet, and delivers the print paper sheet outside the apparatus. The printer 110 comprises a sheet feed unit 109 having a plurality of types of print paper cassettes, a marking unit 107 having a function of transferring and fixing image data onto a print paper sheet, and a delivery unit 108 having a function of sorting and stapling printed paper sheets, and outputting them outside the apparatus.

Reference numeral 104 denotes a controller which is electrically connected to the reader 101 and printer 110, and further connected to a network 111. The controller 104 provides a copying function of controlling the reader 101 to read image data of a document, and controlling the printer 110 to output image data onto a print paper sheet. The controller 104 also provides a scanner function of converting image data read by the reader 101 into code data and transmitting the code data to a host computer (not shown) via the network 111, and a printer function of converting code data received from the host computer via the network 111 into image data and outputting the image data to the printer 110.

An operation unit 106 is connected to the controller 104, formed from a liquid crystal touch panel, and provides a user I/F for inputting an instruction to the image processing apparatus.

<Function of Controller>

Figure 2:
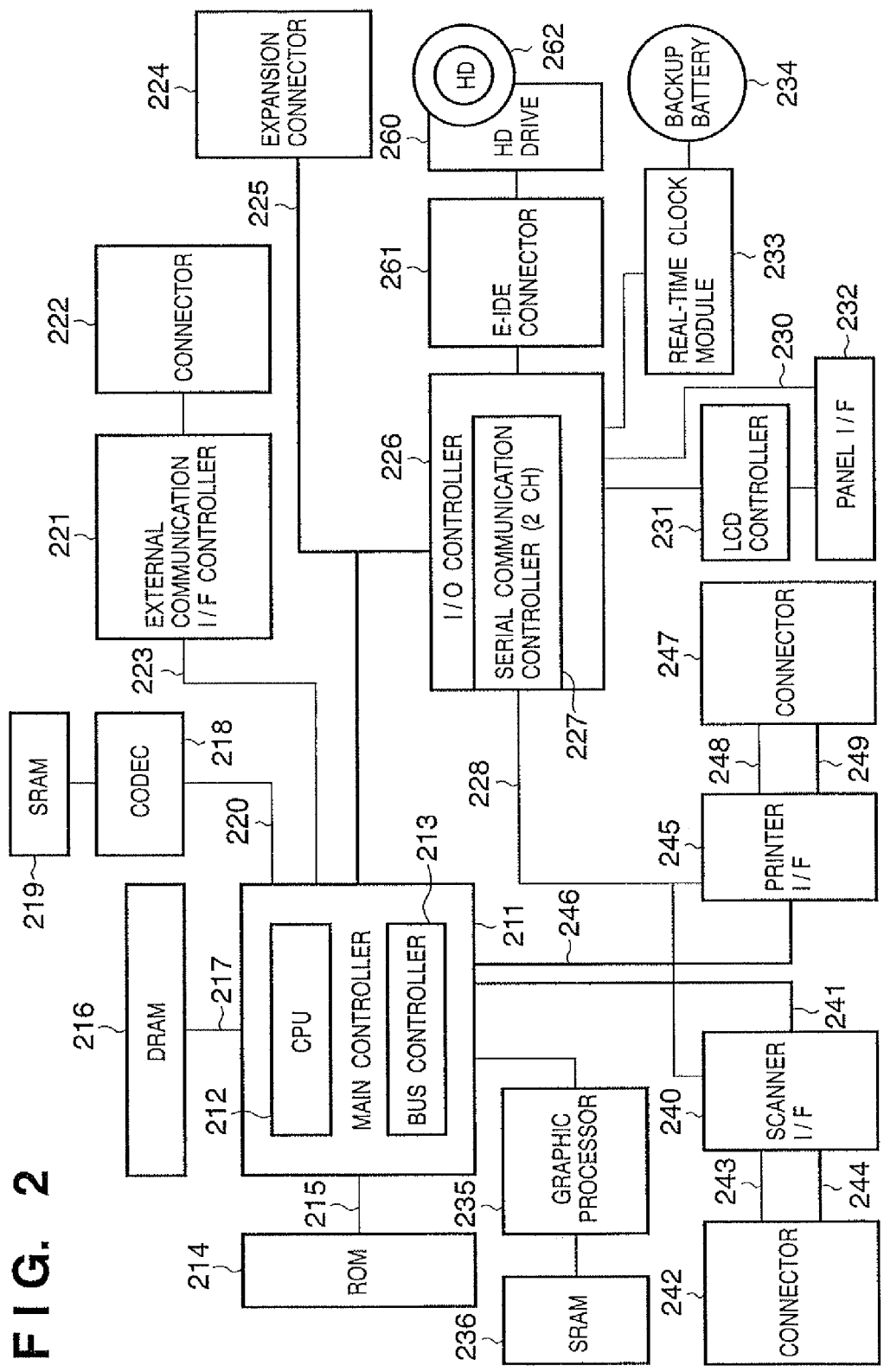
FIG. 2 is a functional block diagram showing a controller.

The function of the controller 104 will be explained with reference to a block diagram shown in FIG. 2. A main controller 211 is mainly comprised of a CPU 212, a bus controller 213, and various I/F controller circuits.

The CPU 212 and bus controller 213 control the overall operation of the controller 104, and the CPU 212 runs on the basis of a program loaded from a ROM 214 via a ROM I/F 215. The program also describes an operation of interpreting PDL (Page Description Language) code data received from a host computer and rasterizing the data into raster image data, and the program is processed by software. The bus controller 213 controls transfer of data input/output from each I/F, and performs arbitration upon bus contention and control of DMA data transfer. The controller 104 further comprises a Web server function, and can describe various pieces of information (status of each part of the apparatus, communication management information, address book, and the like) in the image processing apparatus in the HTML form so as to allow an external PC to refer to these pieces of information by using a Web browser.

A DRAM 216 is connected to the main controller 211 via a DRAM I/F 217, and is used as a work area for operating the CPU 212 and an area for storing image data.

A Codec 218 compresses raster image data stored in the DRAM 216 by a form such as MH/MH/MR/MMRR/JBIG/JPEG, and decompresses compressed/stored code data into raster image data. An SRAM 219 is used as a temporary work area of the Codec 218. The Codec 218 is connected to the main controller 211 via an I/F 220, and data transfer between the Codec 218 and the DRAM 216 is controlled as DMA transfer by the bus controller 213.

A graphic processor 235 performs image rotation and variable magnification processing. In the image processing apparatus 100 according to the embodiment, the graphic processor 235 performs processes such as extraction, analysis, generation, and embedding of barcode information and watermark information.

An external communication I/F controller 221 is connected to the main controller 211 via an I/F 223, and an external network via a connector 222. With an e-mail transmission function using known SMTP (Simple Mail Transfer Protocol), the external communication I/F controller 221 can transmit e-mail having, as an attached file, image data that is sent from the reader 101 and compressed by the Codec 218, or can transmit a file obtained by the Codec 218 by FTP (File Transfer Protocol). The external communication I/F controller 221 can also transmit information in the apparatus that is converted into HTML data by the Web server function, to a terminal connected to the URL of the apparatus via port "80" in accordance with HTTP.

A general-purpose high-speed bus 225 connects an I/O controller 226 and an expansion connector 224 for connecting an expansion board. The general-purpose high-speed bus is generally a PCI bus.

The I/O controller 226 is equipped with a start-stop synchronization serial communication controller 227 for two channels that transmits/receives control commands to/from the CPUs of the reader 101 and printer 110. The I/O controller 226 is connected to external I/F circuits (scanner I/F 240 and printer I/F 245) via an I/O bus 228.

A panel I/F 232 is connected to an LCD controller 231, and formed from an I/F for display on the liquid crystal screen of the operation unit 106 and a key input I/F 230 for inputs from hard keys and touch panel keys.

The operation unit 106 comprises a liquid crystal display, a touch panel input device adhered onto the liquid crystal display, and a plurality of hard keys. A signal input from the touch panel or hard key is transmitted to the CPU 212 via the panel I/F 232, and the liquid crystal display displays image data sent from the panel I/F 232. The liquid crystal display displays functions, image data, and the like in the operation of the image processing apparatus 100.

A real-time clock module 233 updates and saves a date and time managed in the apparatus, and is backed up by a backup battery 234.

An E-IDE connector 261 connects an external storage device. The embodiment uses the I/F 261 to connect a hard disk drive 105, store image data in a hard disk 262, and read out image data from the hard disk 262.

Connectors 242 and 247 are respectively connected to the reader 101 and printer 110, and made up of start-stop synchronization serial I/Fs (243 and 248) and video I/Fs (242 and 249).

The scanner I/F 240 is connected to the reader 101 via the connector 242 and the main controller 211 via a scanner bus 241. The scanner I/F 240 has a function of performing a predetermined process for an image received from the reader 101, and also has a function of outputting to the scanner bus 241 a control signal generated on the basis of a video control signal sent from the reader 101.

Data transfer from the scanner bus 241 to the DRAM 216 is controlled by the bus controller 213.

The printer I/F 245 is connected to the printer 110 via the connector 247 and to the main controller 211 via a printer bus 246. The printer I/F 245 has a function of performing a predetermined process for image data output from the main controller 211 and outputting the processed data to the printer 110, and also has a function of outputting to the printer bus 246 a control signal generated on the basis of a video control signal sent from the printer 110.

Transfer of raster image data rasterized in the DRAM 216 to the printer 110 is controlled by the bus controller 213, and the raster image data is DMA-transferred to the printer 110 via the printer bus 246 and video I/F 249.

<Arrangement of Image Processing System>

Figure 3:
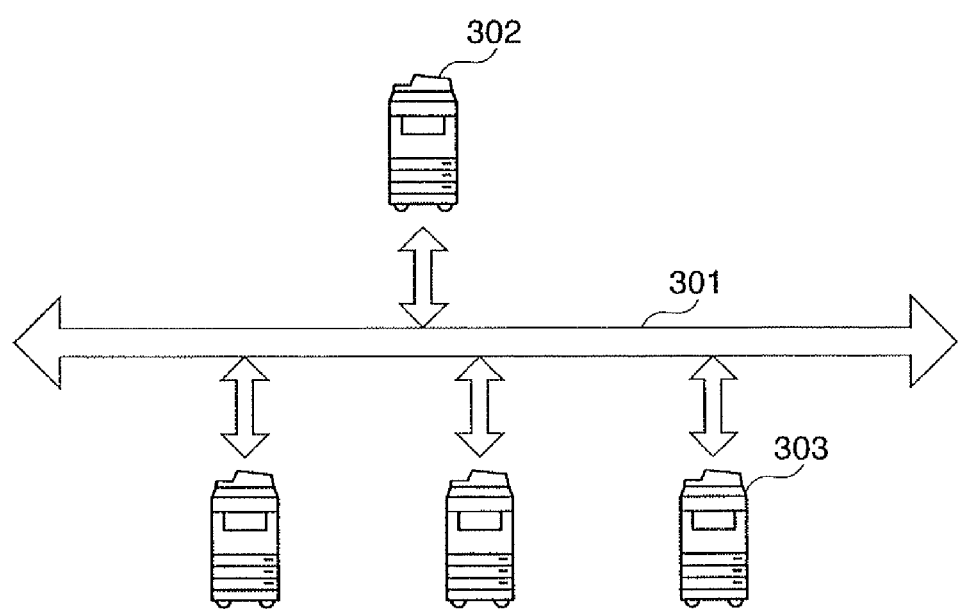
FIG. 3 is a view showing the arrangement of an image processing system having the image processing apparatus according to the embodiment of the present invention.

An image processing system having a plurality of image processing apparatuses as shown in FIG. 1 according to the embodiment will be explained with reference to FIG. 3. In the image processing system in which a plurality of image processing apparatuses according to the embodiment are connected to a network 301, as shown in FIG. 3, each image processing apparatus can operate as a transmitting image processing apparatus which transmits reference set information, or a receiving image processing apparatus which receives transmitted set information. That is, each image processing apparatus has both a function when operating as an image processing apparatus on the receiving side and a function when operating as an image processing apparatus on the receiving side. These functions are switched and used depending on which of the transmitting and receiving sides the image processing apparatus operates on. In the example of FIG. 3, an image processing apparatus 302 operates as a transmitting image processing apparatus, and an image processing apparatus 303 operates as a receiving image processing apparatus. In the embodiment, set information includes an address book in which pieces of address information (when the image processing apparatus has a FAX function, including a telephone number for FAX transmission) selected in e-mail transmission or FTP transmission by the external communication I/F controller 221 are registered, and display information to the operation unit 106 that is customized for each user.

Functions of each image processing apparatus in the image processing system will be described with reference to FIGS. 4 to 8. For descriptive convenience, image processing apparatuses are classified into transmitting and receiving image processing apparatuses, and the same reference numerals denote the same functions throughout the drawings. In the following description, "controlled by the CPU 212" represents a process routine controlled by the CPU 212 on the basis of a program loaded to the DRAM 216, and "constructed in the hard disk 262" means to use a specific area in the hard disk 262 for a given function.

<Description of Transmission/Reception Function>

Figure 4:
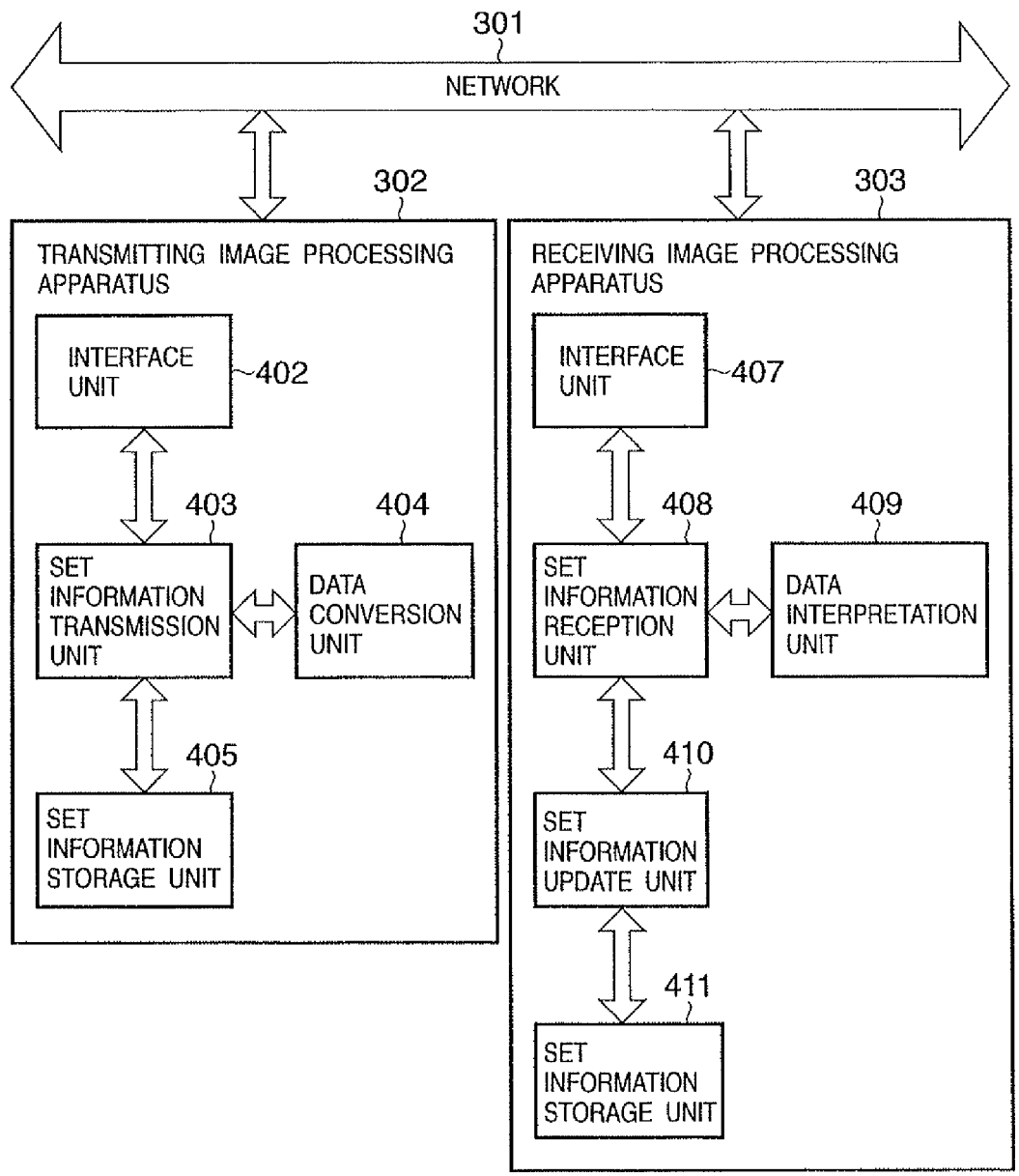
FIG. 4 is a functional block diagram for explaining the transmission/reception function of each image processing apparatus in the image processing system.

FIG. 4 is a functional block diagram for explaining the transmission/reception function of each image processing apparatus in the image processing system. Of image processing apparatuses connected to the network 301, the image processing apparatus 302 serves as a transmitting side, and the image processing apparatus 303 serves as a receiving side.

The transmitting image processing apparatus 302 has a plurality of functions. An interface unit 402 (corresponding to the external communication I/F controller 221) connects the network 301 and transmitting image processing apparatus 302. More specifically, the interface unit 402 is an Ethernet board used to connect Ethernet, a modem used to connect a public line, or the like. Set information stored in a set information storage unit 405 (constructed in the hard disk 262) is extracted by a set information transmission unit 403 (controlled by the CPU 212), and converted by a data conversion unit 404 (controlled by the CPU 212) into a form for transmitting the set information to the network 301 such as an XML. The set information transmission unit 403 transmits the converted data to the receiving image processing apparatus 303 via the interface unit 402.

In the receiving image processing apparatus 303, data received by a set information reception unit 408 (controlled by the CPU 212) via an interface unit 407 (corresponding to the external communication I/F controller 221) is converted into data of an internal form by a data interpretation unit 409 (controlled by the CPU 212). A set information update unit 410 (controlled by the CPU 212) writes the converted data as set information in a set information storage unit 411 (constructed in the hard disk 262). As a result, pieces of set information in the transmitting and receiving image processing apparatuses are synchronized with each other. In transmitting set information, all pieces of transmittable set information can be transmitted, or set information to be transmitted can be selected for each item (for example, only an address book or user settings are transmitted).

<Description of Set Information Return Function>

Figure 5:
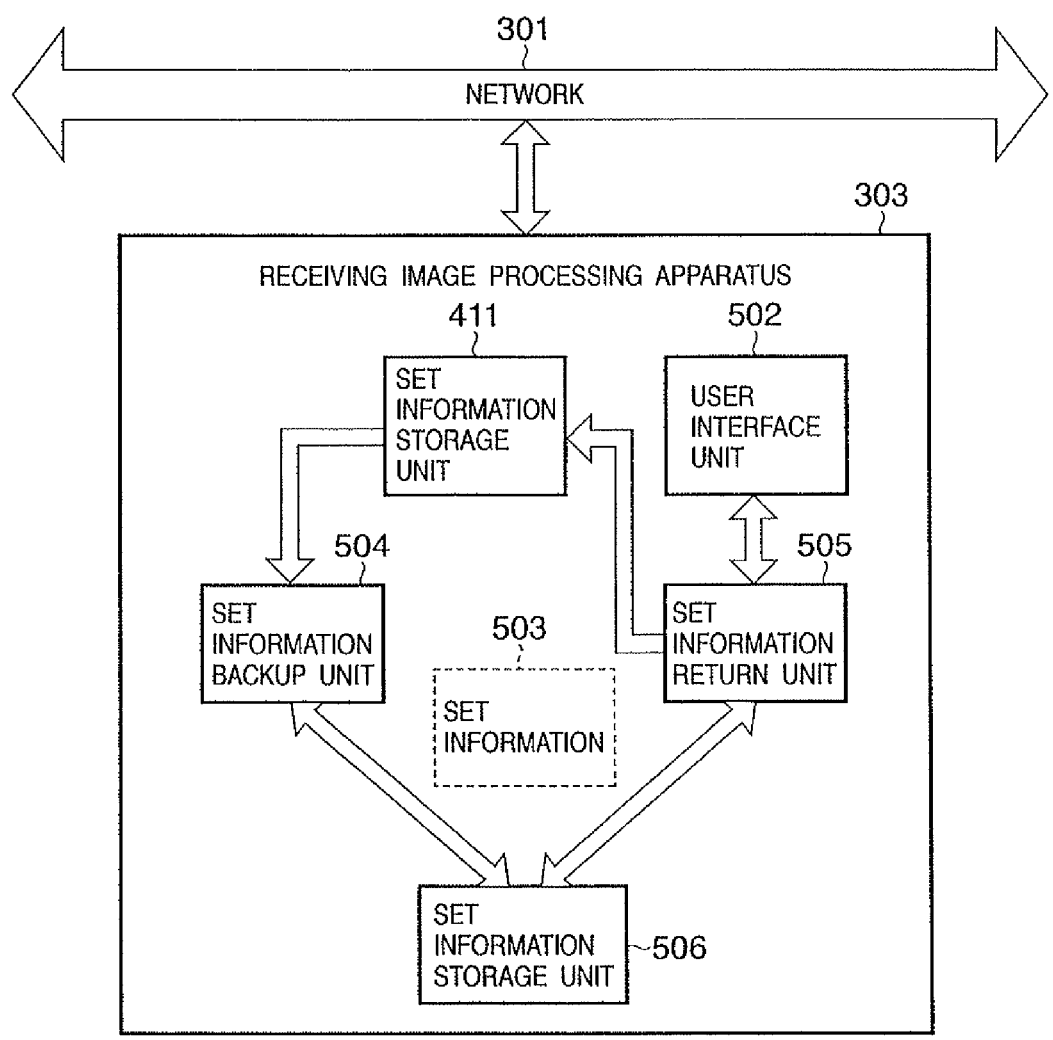
FIG. 5 is a functional block diagram for explaining the set information return function of a receiving image processing apparatus in the image processing system.

FIG. 5 is a functional block diagram for explaining the set information return function of the receiving image processing apparatus in the image processing system. The receiving image processing apparatus 303 is connected to the network 301.

In the receiving image processing apparatus 303, a user interface unit 502 (corresponding to the operation unit 106) is made up of an LCD panel and keyboard, displays the status of the apparatus, and accepts an input from the administrator. When set information is sent from the transmitting image processing apparatus (not shown in FIG. 5), the receiving image processing apparatus 303 temporarily copies set information 503 saved in the set information storage unit 411 to a set information storage unit 506 (constructed in the hard disk 262) by using a set information backup unit 504 (controlled by the CPU 212). Then, the receiving image processing apparatus 303 updates the set information saved in the set information storage unit 411 to the set information sent from the transmitting image processing apparatus.

When return to set information before update is designated by the administrator via the user interface unit 502, a set information return unit 505 (controlled by the CPU 212) reads out the set information 503 backed up in the set information storage unit 506, and overwrites the set information 503 on the set information of the receiving image processing apparatus 303. Accordingly, updated set information can be returned to set information before update.

<Description of Retransmission Function>

Figure 6:
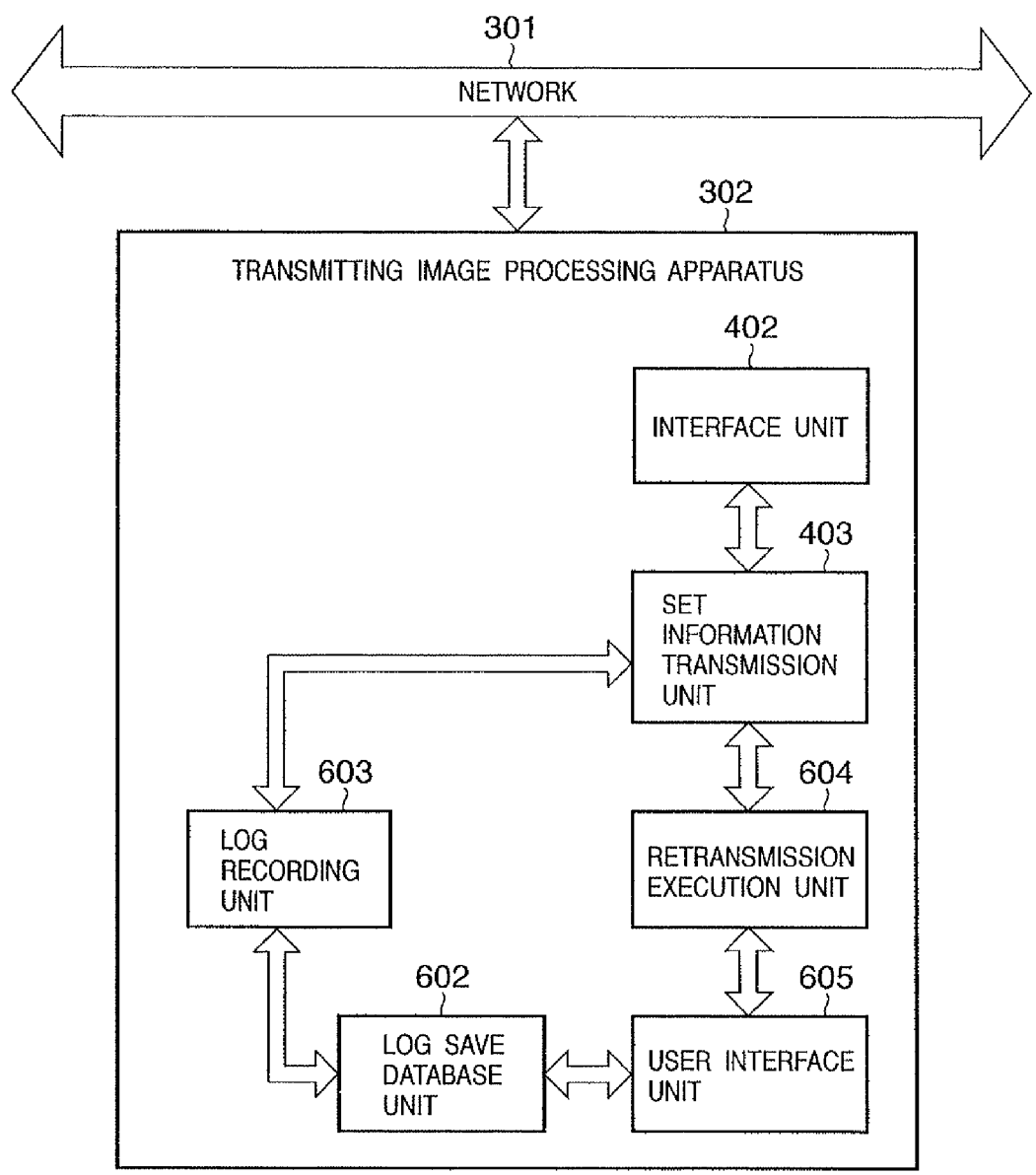
FIG. 6 is a functional block diagram for explaining the retransmission function of a transmitting image processing apparatus in the image processing system.

FIG. 6 is a functional block diagram for explaining the retransmission function of the transmitting image processing apparatus in the image processing system. The transmitting image processing apparatus 302 is connected to the network 301.

When the set information transmission unit 403 of the transmitting image processing apparatus 302 transmits its own set information to another image processing apparatus via the interface unit 402, a log recording unit 603 (constructed in the hard disk 262) saves the transmission log in a log save database unit 602 (constructed in the hard disk 262) in the transmitting image processing apparatus 302. The transmission log holds a destination, time, and transmission log when the set information transmission unit 403 executes transmission. The administrator can confirm the log via a user interface unit 605 (corresponding to the operation unit 106). In accordance with a request from the administrator, a retransmission execution unit 604 (controlled by the CPU 212) is operated to execute transmission again on the basis of the log information.

<Description of Rejection Function of Update of Set Information>

Figure 7:
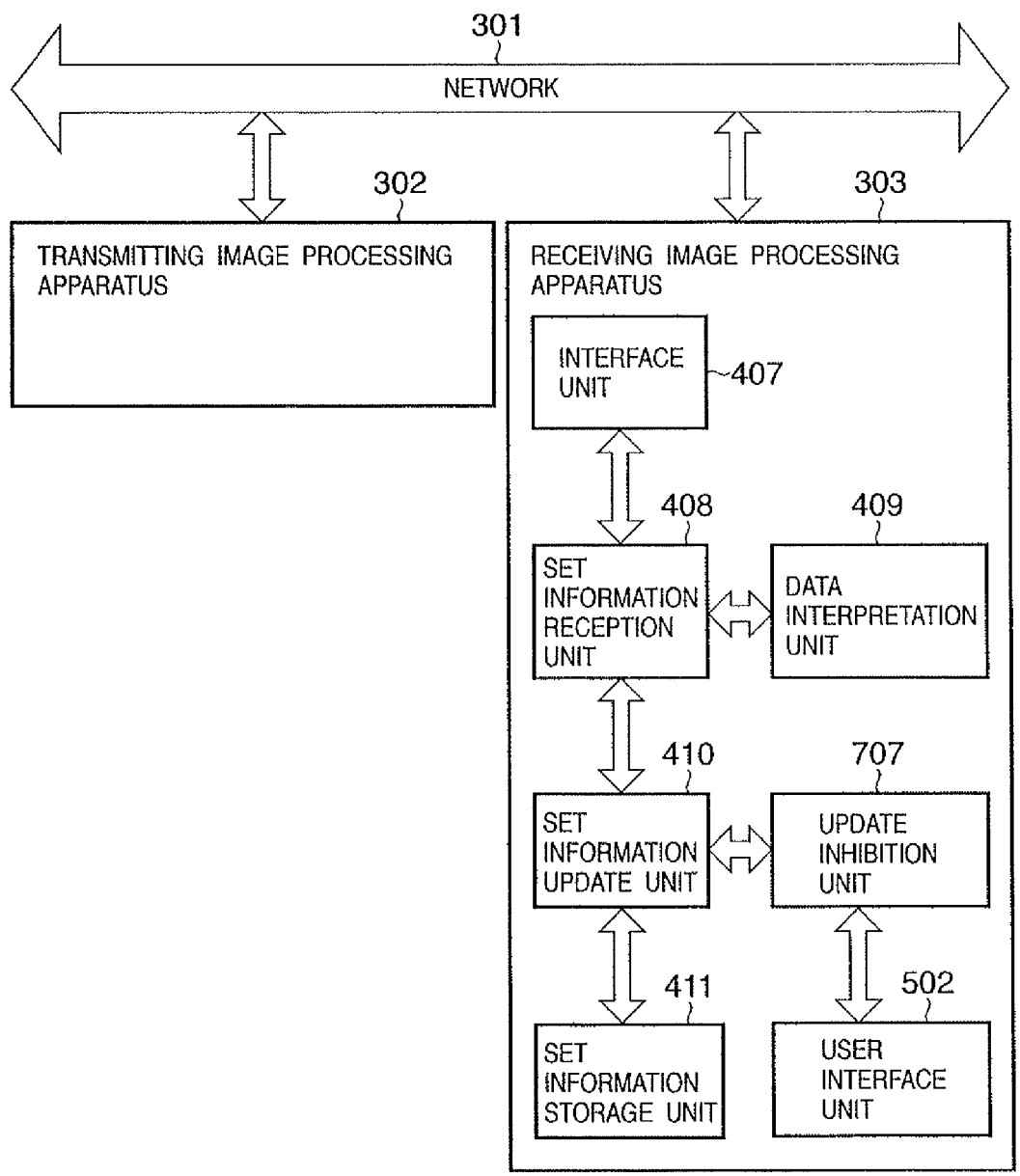
FIG. 7 is a functional block diagram for explaining the rejection function of update of set information of the receiving image processing apparatus in the image processing system.

FIG. 7 is a functional block diagram for explaining the rejection function of update of set information of the receiving image processing apparatus in the image processing system. Of image processing apparatuses connected to the network 301, the image processing apparatus 302 serves as a transmitting side, and the image processing apparatus 303 serves as a receiving side.

Set information sent from the transmitting image processing apparatus 302 via the network 301 is received by the set information reception unit 408 via the interface unit 407.

The received set information is converted into an internal data form by the data interpretation unit 409, and then transferred to the set information update unit 410. The set information storage unit 411 updates the converted data as set information of the receiving image processing apparatus 303. When inhibition of updating data is designated by the administrator via the user interface unit 502, an update inhibition unit 707 (controlled by the CPU 212) disables update of data in the set information storage unit 411 (i.e., the user interface unit 502 allows inputting an update enable/disable instruction). Disabling update means to disable update by inhibiting write in the hard disk which stores set information. Rejection of update of set information can be an instruction to reject "all pieces of received set information", and an instruction to inhibit update of each set item (inhibit update of only an address book or inhibit update of only user settings). The set information update unit 410 updates set information by determining for each item whether update is enabled/disabled.

This process can avoid update of set information against the user's will.

<Description of Data Form Conversion Function>

Figure 8:
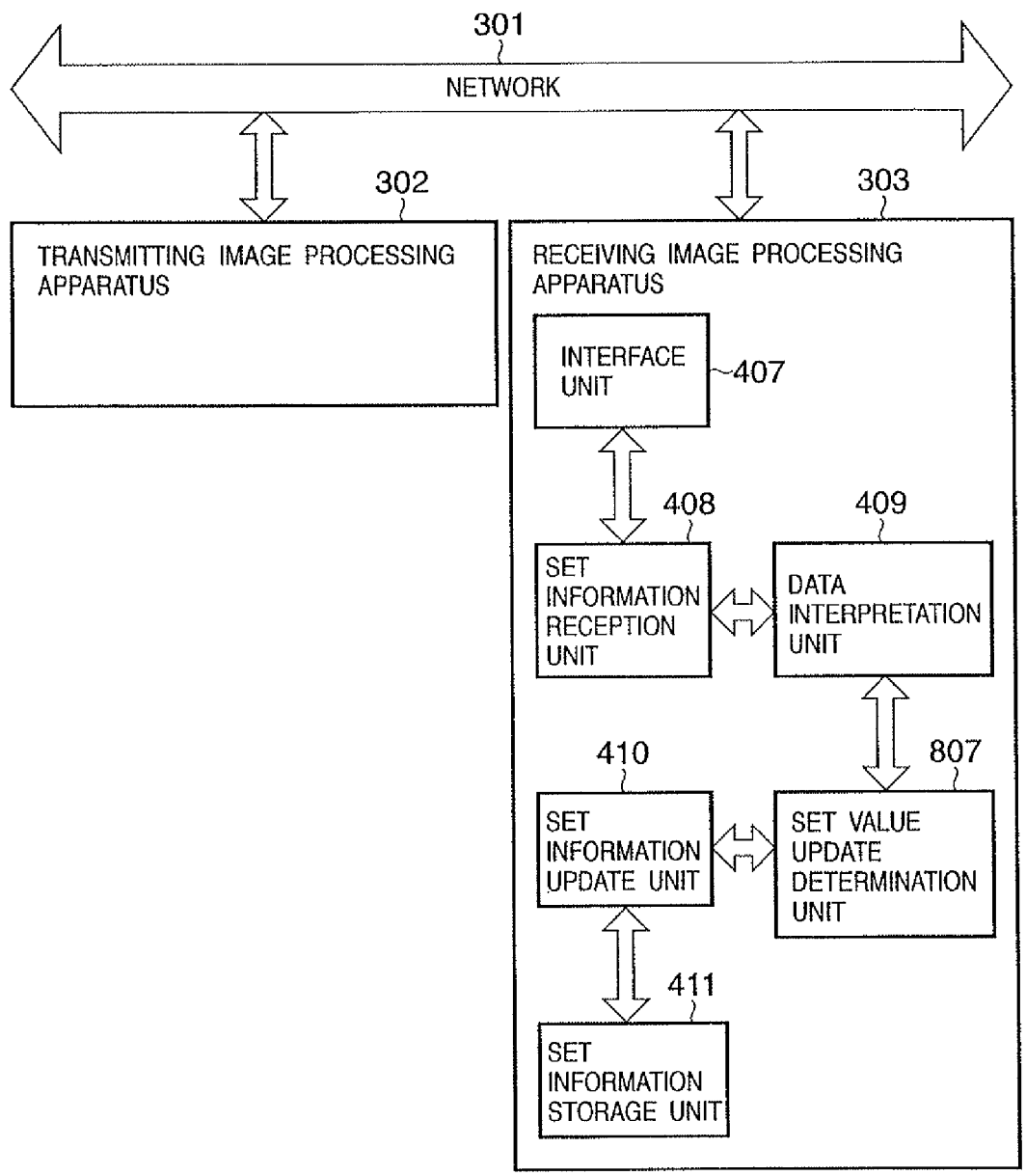
FIG. 8 is a functional block diagram for explaining the data form conversion function of the receiving image processing apparatus in the image processing system.

FIG. 8 is a functional block diagram for explaining the data form conversion function of the receiving image processing apparatus in the image processing system. Of image processing apparatuses connected to the network 301, the image processing apparatus 302 serves as a transmitting side, and the image processing apparatus 303 serves as a receiving side.

Set information sent from the transmitting image processing apparatus 302 via the network 301 is received by the set information reception unit 408 via the interface unit 407.

The received set information is converted into an internal data form by the data interpretation unit 409, and then transferred to the set information update unit 410. Before transferring the set information, a set information update determination unit 807 determines whether the item of the transmitted set information exists in the image processing apparatus of the receiving image processing apparatus 303. For example, when the transmitting image processing apparatus 302 is a color copying machine and the receiving image processing apparatus 303 is a monochrome copying machine, the receiving image processing apparatus 303 does not support any item on color information. However, many items such as the number of copies or the sheet feed method can be commonly used regardless of the type of apparatus. An item determined by the set information update determination unit 807 to be updatable is transferred to the set information update unit 410, and saved in the set information storage unit 411.

When the type of apparatus is different, a value is converted and written so that set information is given the same meaning. For example, when the transmitting image processing apparatus is a monochrome copying machine and the receiving image processing apparatus is a color copying machine, the monochrome copying machine has only one black density, and the color copying machine has four, C, M, Y, and K densities. In this case, it is considered appropriate to set the black density for each of C, M, Y, and K. Thus, the receiving image processing apparatus converts the data form so as to write the black density for each of C, M, Y, and K.

<Flow of Set Information Transmission Process>

Figure 9:
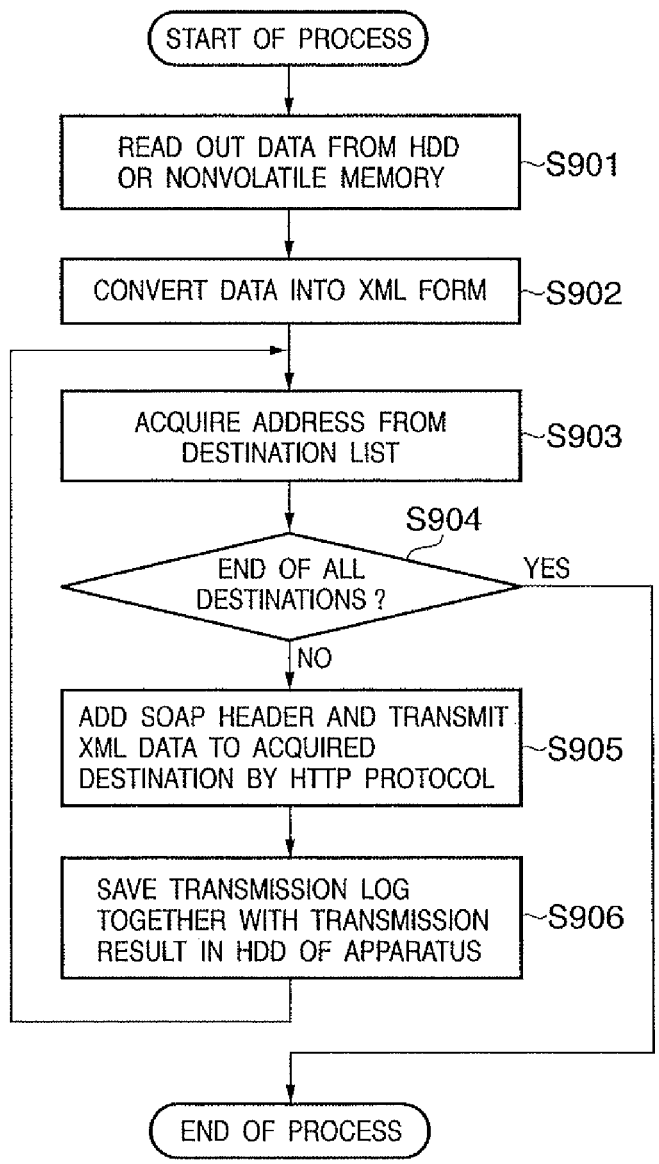
FIG. 9 is a flowchart showing the flow of a set information transmission process in the image processing apparatus according to the embodiment of the present invention.

FIG. 9 is a flowchart showing the flow of a set information transmission process in the image processing apparatus according to the embodiment. In step S901, set information saved in the hard disk or nonvolatile memory in the transmitting image processing apparatus is read out. In step S902, the readout set information is converted into an XML form a in order to transmit the readout set information as SOAP data.

In step S903, the Internet address list of destination image processing apparatuses designated by the administrator in advance is referred to, and one address is extracted from the list. In step S904, it is determined whether all the addresses of the list have been processed. If YES in step S904, a series of processes end.

If it is determined in step S904 that all the addresses of the list have not been processed, the flow advances to step S905 to extract the data converted into XML and transmit the data embedded in a SOAP message to the receiving image processing apparatus by the HTTP protocol. The receiving image processing apparatus sends back the communication result as a SOAP response upon reception of the data. If the destination is illicit and data does not reach the receiving image processing apparatus, time-out occurs. The transmitting image processing apparatus can recognize that transmission fails.

In step S906, the destination and time are saved as a log together with the transmission result in the log save database unit 602 in the hard disk after the end of transmission to one destination. In general, data transmission is periodically automatically executed, and the administrator can refer to the log at his convenience and confirm whether any communication failure occurs. When a transmission condition such as the destination is proper but communication fails owing to any failure, the administrator selects a failed communication line from the log list, touches the retransmission button, and can easily execute transmission again.

If the process in step S906 ends, the flow returns to step S903 for the purpose of transmission to the next destination. Processes from step S903 to step S906 are repeated.

<Flow of Set Information Reception Process>

Figure 10:
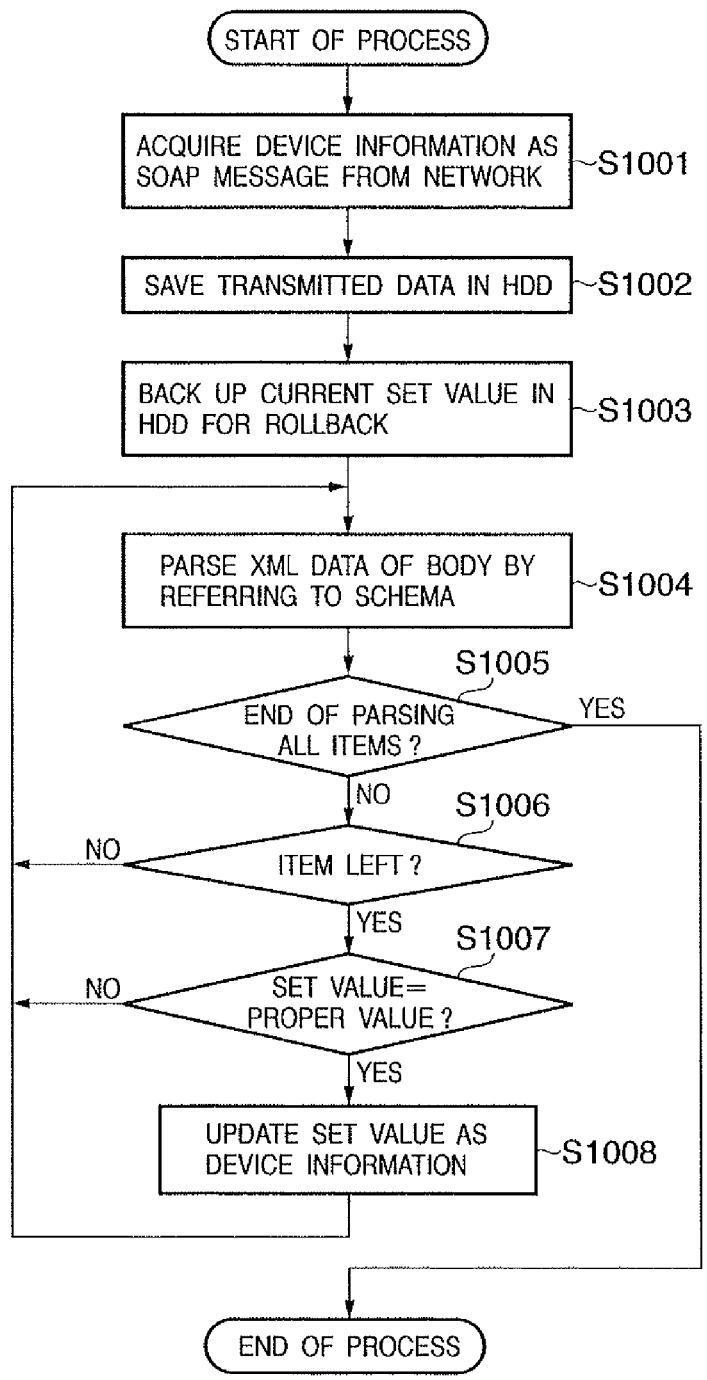
FIG. 10 is a flowchart showing the flow of a set information reception process in the image processing apparatus according to the embodiment of the present invention.
Figure 11:
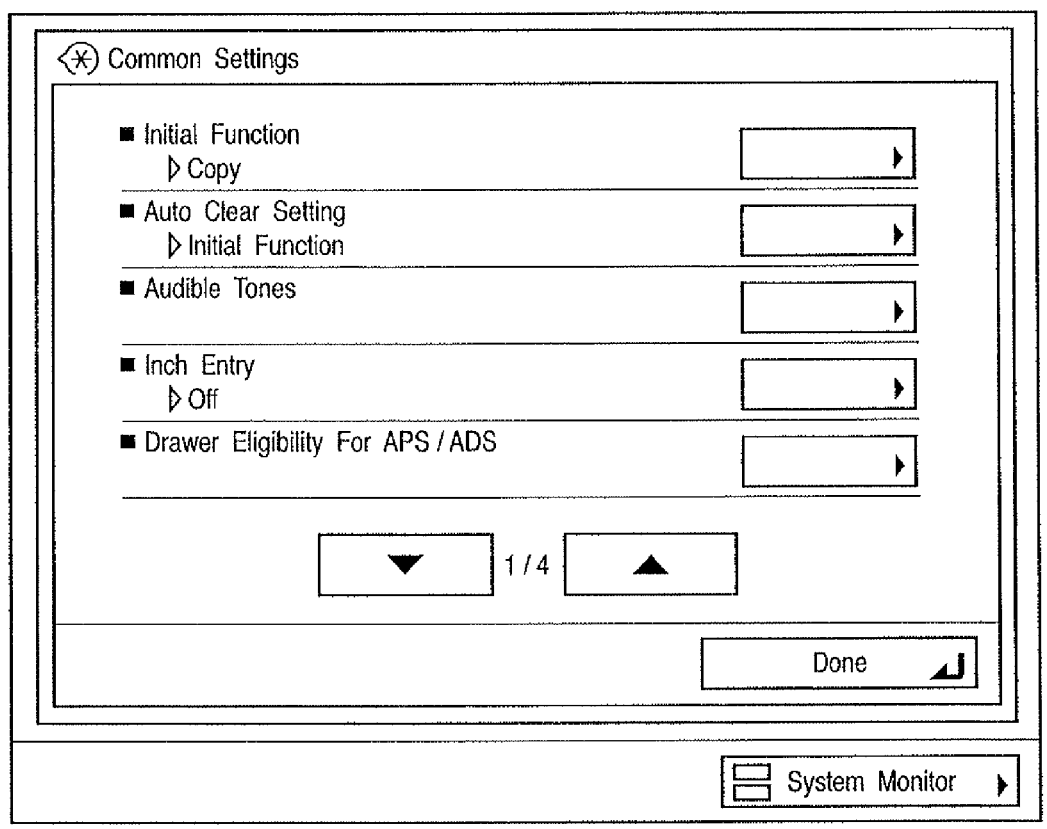
FIG. 11 is a view showing an example of a setting window for inputting set information of the image processing apparatus.

FIG. 10 is a flowchart showing the flow of a set information reception process in the receiving image processing apparatus according to the embodiment.

The receiving image processing apparatus accepts a SOAP message as a Web service. When the receiving image processing apparatus is wanted to be used as a transmitting image processing apparatus, the apparatus changes to a set information update inhibition state so as to inhibit acceptance of any SOAP message and update of set information.

In step S1001, a SOAP message created by the transmitting image processing apparatus is received via the network 301. In step S1002, the received SOAP message is saved as a file in the hard disk in the receiving image processing apparatus.

In step S1003, the current set information is stored as a backup file in the hard disk in order to realize rollback operation of returning the apparatus to a state before update that is desired by the administrator after set information is updated. The number of backup files can be arbitrarily set by the administrator under the condition that the file capacity does not exceed the upper limit of the hard disk.

In step S1004, the received data is parsed by referring to an XML schema which defines the type and value range of data. Note that the schema is saved in the receiving image processing apparatus. In step S1005, it is determined whether all received data have been parsed, and if YES in step S1005, the process ends.

If it is determined in step S1005 that all received data have not been parsed, the flow advances to step S1006. In step S1006, if a given item exits in the received data but does not exist in the schema, the item is skipped. This state occurs when the type of apparatus is different between the transmitting image processing apparatus and the receiving image processing apparatus or the version is different. Received data of the skipped item can also be left in the log when the administrator selects the item.

In step S1007, the value of the received data is verified to determine whether the value falls within a proper range. If the value falls outside the range, the item is skipped. Similar to step S1006, this state occurs when the type of apparatus is different between the transmitting image processing apparatus and the receiving image processing apparatus or the version is different. Received data of the skipped item can also be left in the log when the administrator selects the item.

In step S1008, the value which has passed through steps S1006 and S1007 is written in the hard disk or nonvolatile memory in the receiving image processing apparatus. At this time, when the types of transmitting image processing apparatus and receiving image processing apparatus are the same, the value is directly written, but when the types are different, the value is so converted as to give the same meaning to the set information, and then written. For example, assume that set information on density is received when the transmitting image processing apparatus is a monochrome copying machine and the receiving image processing apparatus is a color copying machine. The monochrome copying machine has only one black density, and the color copying machine has four, C, M, Y, and K densities. In this case, it is considered appropriate to set the black density for each of C, M, Y, and K. Thus, the receiving image processing apparatus converts the data form so as to write the black density for each of C, M, Y, and K. After the end of write, the flow returns to step S1004 in order to continue the process for the next item.

As described above, according to the embodiment, the versatility can be enhanced by exchanging set information after converting it into XML data. Even when various functions are added to the image processing apparatus in the future, pieces of set information on the added functions can also be easily exchanged by adding new tags.

Communication procedures adopt SOAP which is versatile and can easily cope with various devices. Since HTTP is used as a low-order protocol, no redundant port need be opened, and each apparatus can easily deal with HTTP. Communication management and the like can be facilitated by using port "80" when information in the apparatus is provided by the Web server function.

In the embodiment, no special server need be arranged for synchronization of set information, and the system can be constructed at low cost.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved when a storage medium which stores software program codes for realizing the functions of the above-described embodiment is supplied to a system or apparatus, and the computer (or the CPU or MPU) of the system or apparatus reads out and executes the program codes stored in the storage medium.

In this case, the program codes read out from the storage medium realize the functions of the above-described embodiment, and the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The functions of the above-described embodiment are realized when the computer executes the readout program codes. Also, the functions of the above-described embodiment are realized when an OS (Operating System) or the like running on the computer performs some or all of actual processes on the basis of the instructions of the program codes.

Furthermore, the present invention includes a case in which, after the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes and thereby realizes the functions of the above-described embodiment.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-220685 filed on Jul. 28, 2004, which is hereby incorporated by reference herein.

What is claimed is:

1. An image processing apparatus connectable to a network, comprising:
   a storage unit configured to store first address book information indicating transmission destination of data which is to be transmitted outside the image processing apparatus and first set information for operating the image processing apparatus;
   a receiving unit configured to receive, from an external apparatus via the network, second address book information indicating transmission destination of data which is to be transmitted outside the image processing apparatus and second set information;
   a setting unit configured to set a first setting as to whether or not to update the first address book information and a second setting as to whether or not to update the first set information; and
   an updating unit configured to, in a case where the first setting indicating update of the first address book information is set by the setting unit, update the first address book information stored in the storage unit with the second address book information received by the receiving unit, and in a case where the first setting indicating no update of the first address book information is set by the setting unit, not update the first address book information stored in the storage unit with the second address book information received by the receiving unit, and to, in a case where the second setting indicating update of the first set information is set by the setting unit, update the first set information stored in the storage unit with the second set information received by the receiving unit, and in a case where the second setting indicating no update of the first set information is set by the setting unit, not update the first set information stored in the storage unit with the second set information received by the receiving unit.

2. The apparatus according to claim 1, wherein the second address book information is received in accordance with a procedure defined by SOAP (Simple Object Access Protocol).

3. The apparatus according to claim 1, further comprising:
   a scanner unit configured to generate image data by scanning a document; and
   a transmitting unit configured to transmit the image data generated by the scanner unit based on the first address book information stored in the storage unit.

4. The apparatus according to claim 1, further comprising a transmitting unit configured to transmit an e-mail, wherein the first address book information includes an e-mail address which indicates transmission destination of the e-mail to be transmitted by the transmitting unit.

5. The apparatus according to claim 1, further comprising:
   a back-up unit configured to back-up the first address book information stored in the storage unit by using another storage area before updating by the updating unit;
   a return instruction acceptance unit configured to accept, from a user, an instruction to return the second address book information which has been stored in the storage unit in accordance with updating by the updating unit to the first address book information backed-up by the back-up unit; and
   a return unit configured to return the second address book information which has been stored in the storage unit in accordance with updating by the updating unit to the first address book information backed-up by the back-up unit, in a case that the return instruction acceptance unit accepts the instruction.

6. The apparatus according to claim 5, wherein the return unit overwrites the second address book information stored in the storage by using the first address book information backed-up by the back-up unit.

7. The apparatus according to claim 1, wherein the updating unit refers to definition information contained in the second address book information received by the receiving unit which is described by a structured document form and updates the first address book information stored in the storage unit with the second address book information.

8. The apparatus according to claim 7, wherein the structured document form includes XML, and the definition information uses an XML schema.

9. The apparatus according to claim 1, further comprising:
a transmitting unit configured to transmit the first address book information stored in the storage unit to another image processing apparatus.

10. The apparatus according to claim 9, further comprising:
a recording unit configured to record a transmission log when the transmitting unit transmits the first address book information, wherein the transmitting unit can perform retransmission by using a destination contained in the transmission log.

11. The apparatus according to claim 1, wherein, in a case where the first setting indicating no update of the first address book information is set by the setting unit, the updating unit does not update the first address book information stored in the storage unit with the second address book information even if the second address book information has been received by the receiving unit.

12. The apparatus according to claim 1, wherein the image processing apparatus is an image processing apparatus which is usable in a system environment in which common address book information and set information can be transmitted from one apparatus to a plurality of apparatuses.

13. An information processing method in an image processing apparatus connectable to a network, the method comprising steps of:
storing, in a storage unit, first address book information indicating transmission destination of data which is to be transmitted outside the image processing apparatus and first set information for operating the image processing apparatus;
receiving from an external apparatus via the network, second address book information indicating transmission destination of data which is to be transmitted outside the image processing apparatus and second set information;
setting a first setting as to whether or not to update the first address book information and a second setting as to whether or not to update the first set information;
updating, in a case where the first setting indicating update of the first address book information is set, the first address book information stored in the storage unit with the second address book information received in the receiving step, and not updating, in a case where the first setting indicating no update of the first address book information is set, the first address book information stored in the with the second address book information received in the receiving step; and
updating, in a case where the second setting indicating update of the first set information is set, the first set information stored in the storage unit with the second set information received in the receiving step, and not updating, in a case where the second setting indicating no update of the first set information is set, the first set information stored in the storage unit with the second set information received in the receiving step.

14. A non-transitory computer-readable medium encoded with a computer readable control program which, when executed by a processor, will cause a computer to execute an information processing method in an image processing apparatus connectable to a network, the method comprising steps of:
storing, in a storage unit, first address book information indicating transmission destination of data which is to be transmitted outside the image processing apparatus and first set information for operating the image processing apparatus;
receiving from an external apparatus via the network, second address book information indicating transmission destination of data which is to be transmitted outside the image processing apparatus and second set information;
setting a first setting as to whether or not to update the first address book information and a second setting as to whether or not to update the first set information;
updating, in a case where the first setting indicating update of the first address book information is set, the first address book information stored in the storage unit with the second address book information received in the receiving step, and not updating, in a case where the first setting indicating no update of the first address book information is set, not updating the first address book information stored in the storage unit with the second address book information received in the receiving step, and
updating, in a case where the second setting indicating update of the first set information is set, the first set information stored in the storage unit with the second set information received in the receiving step, and not updating, in a case where the second setting indicating no update of the first set information is set, the first set information stored in the storage unit with the second set information received in the receiving step.

15. An image processing apparatus connectable to a network, comprising:
a storage unit configured to store first type of set information and second type of set information;
a receiving unit configured to receive, from an external apparatus via the network, first type of set information and second type of set information;
a setting unit configured to set, before the receiving unit receives the first type of set information and the second type of set information, a first setting as to whether or not to update the stored first type of set information and a second setting as to whether or not to update the stored second type of set information; and
an updating unit configured to, in a case where the first setting indicating update of the stored first type of set information is set by the setting unit, update the stored first type of set information with the received first type of set information, and in a case where the first setting indicating no update of the stored first type of set information is set by the setting unit, not update the stored first type of set information with the received first type of set information, and to, in a case where the second setting indicating update of the stored second type of set information is set by the setting unit, update the stored second type of set information with the received second type of set information, and in a case where the second setting indicating no update of the stored second type of set information is set by the setting unit, not update the stored second type of set information with the received second type of set information.

16. The apparatus according to claim 15, further comprising:
a back-up unit configured to back-up the first type of set information stored in the storage unit by using another storage area before updating by the updating unit;
a return instruction acceptance unit configured to accept, from a user, an instruction to return the first type of set information which has been stored in the storage unit in accordance with updating by the updating unit to the first type of set information backed-up by the back-up unit; and
a return unit configured to return the first type of set information which has been stored in the storage unit in accordance with updating by the updating unit to the first type of set information backed-up by the back-up unit, in a case that the return instruction acceptance unit accepts the instruction.

17. The apparatus according to claim 16, wherein the return unit overwrites the first type of set information which has been stored in the storage unit in accordance with updating by the updating unit by using the first type of set information backed-up by the back-up unit.

18. The apparatus according to claim 15, further comprising:
a transmitting unit configured to transmit the first type of set information stored in the storage unit to another image processing apparatus.

19. The apparatus according to claim 15, wherein, in a case where the first setting indicating no update of the stored first type of set information is set by the setting unit, the updating unit does not update the stored first type of set information with the received first type of set information even if the first type of set information has been received by the receiving unit.

20. The apparatus according to claim 15, wherein the image processing apparatus is an image processing apparatus which is usable in a system environment in which common first type of set information and second type of set information can be transmitted from one apparatus to a plurality of apparatuses.

21. The apparatus according to claim 15, further comprising:
a scanner unit configured to generate image data by scanning a document.

22. The apparatus according to claim 15, further comprising;
a printing unit configured to print image data on a sheet.

23. An information processing method in an image processing apparatus connectable to a network, the method comprising steps of:
storing, in a storage unit, first type of set information and second type of set information;
receiving, from an external apparatus via the network, first type of set information and second type of set information;
setting, before the first type of set information and the second type of set information are received, a first setting as to whether or not to update the stored first type of set information and a second setting as to whether or not to update the stored second type of set information;
updating, in a case where the first setting indicating update of the stored first type of set information is set, the stored first type of set information with the received first type of set information, and not updating, in a case where the first setting indicating no update of the stored first type of set information is set, the stored first type of set information with the received first type of set information; and
updating, in a case where the second setting indicating update of the stored second type of set information is set, the stored second type of set information with the received second type of set information, and not updating, in a case where the second setting indicating no update of the stored second type of set information is set, the stored second type of set information with the received second type of set information.

24. A non-transitory computer-readable medium encoded with a computer readable control program which, when executed by a processor, will cause a computer to execute an information processing method in an image processing apparatus connectable to a network, the method comprising steps of:
storing, in a storage unit, first type of set information and second type of set information;
receiving, from an external apparatus via the network, first type of set information and second type of set information;
setting, before the first type of set information and the second type of set information are received, a first setting as to whether or not to update the stored first type of set information and a second setting as to whether or not to update the stored second type of set information; and
updating, in a case where the first setting indicating update of the stored first type of set information is set, the stored first type of set information with the received first type of set information, and not updating, in a case where the first setting indicating no update of the stored first type of set information is set, the stored first type of set information with the received first type of set information; and
updating, in a case where the second setting indicating update of the stored second type of set information is set, the stored second type of set information with the received second type of set information, and not updating, in a case where the second setting indicating no update of the stored second type of set information is set, the stored second type of set information with the received second type of set information.

* * * * *